United States Patent [19]

Nagata

[11] Patent Number: 5,077,659
[45] Date of Patent: Dec. 31, 1991

[54] DATA PROCESSOR EMPLOYING THE SAME MICROPROGRAMS FOR DATA HAVING DIFFERENT BIT LENGTHS

[75] Inventor: Miyuki Nagata, Yokohama, Japan
[73] Assignee: Kabushiki Kaisha Toshiba, Kawasaki, Japan
[21] Appl. No.: 631,191
[22] Filed: Dec. 20, 1990

Related U.S. Application Data

[63] Continuation of Ser. No. 200,899, Jun. 1, 1988, abandoned.

[30] Foreign Application Priority Data

Aug. 13, 1987 [JP] Japan ............................. 62-200991

[51] Int. Cl.⁵ .......................... G06F 9/318; G06F 9/38
[52] U.S. Cl. ................................. 395/375; 364/254.9; 364/DIG. 1
[58] Field of Search ... 364/200 MS File, 900 MS File

[56] References Cited

U.S. PATENT DOCUMENTS

| | | | |
|---|---|---|---|
| 4,038,533 | 7/1977 | Dummermuth | 364/900 |
| 4,099,229 | 7/1978 | Kancler | 364/200 |
| 4,219,874 | 8/1980 | Gusev et al. | 364/200 |
| 4,236,206 | 11/1980 | Strecker et al. | 364/200 |
| 4,241,397 | 12/1980 | Strecker et al. | 364/200 |
| 4,246,644 | 1/1981 | Flynn et al. | 364/900 |

OTHER PUBLICATIONS

A. Tanenbaum, "Structured Computer Organization", 1976, Prentice-Hall, pp. 70-79.

*Primary Examiner*—David Y. Eng
*Attorney, Agent, or Firm*—Foley & Lardner

[57] ABSTRACT

A data processor having an inner instruction register, a microinstruction register, and microinstruction decoder for decoding the microinstruction stored in the microinstruction register, and a data expansion section for expanding data bits stored in source and destination registers among general purpose registers when designated by an inner instruction in which the bit lengths of data to be processed can be designated by an inner instruction, a microinstruction for performing the operation of data having same contents but different bit lengths can be made common, thereby reducing the number of steps of the microprograms.

3 Claims, 3 Drawing Sheets

FIG. I

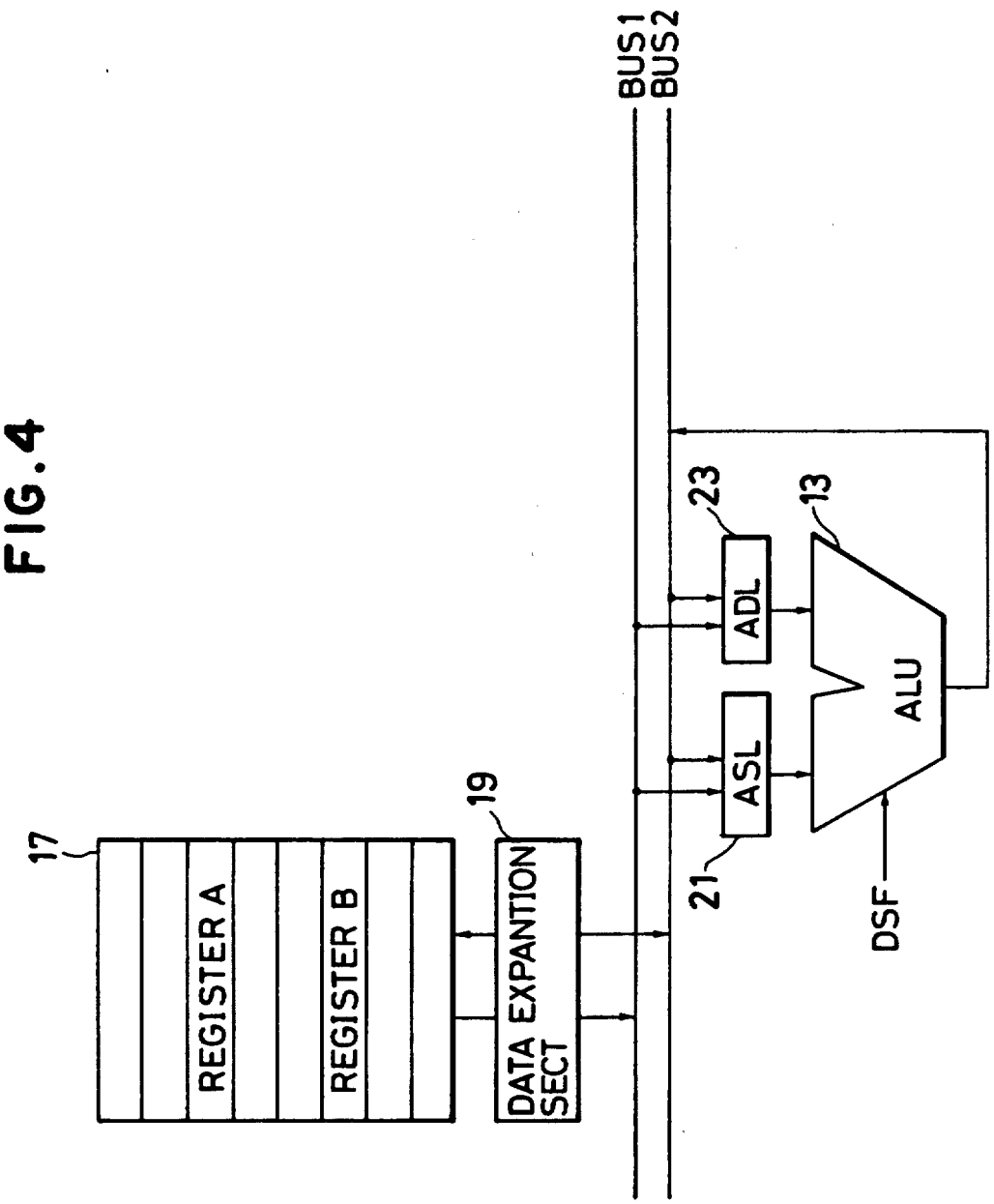

DATA PROCESSOR EMPLOYING THE SAME MICROPROGRAMS FOR DATA HAVING DIFFERENT BIT LENGTHS

This application is a continuation of application Ser. No. 07/200,899, filed June 1, 1988, now abandoned.

BACKGROUND OF THE INVENTION

1. Field of the Invention

The present invention relates to a data processor for performing data processing by a common microprogram for data having the same contents but having different bit lengths.

2. Description of the Prior Art

In data processors, particularly in microprocessor wherein computer instructions are executed by microprograms, it often occurs that data having different bit lengths are designated by mechanical language instructions from a user, i.e., user instructions should be processed.

In the conventional art for processing such a data, microprograms for executing the user instructions are designated by the reading-out of the data designated by user instructions and predetermined fields of inner (or internal) instructions obtained as a result of decoding the user instructions are designated by microinstructions and then are carried out. In addition, bit lengths of data thus read-out, which should be calculated or processed are directly designated by the predetermined fields of microinstructions.

For instance, user instruction which functions so "each lower eight bits of 32-bit general purpose registers A and B are to be added to each other and the result stored in the lower eight bit positions" is executed as follows; the lower eight-bit data of the general purpose registers A and B are applied to data buses indirectly designated by both source register (SR) and destination register (DR) for the inner instruction through microinstructions and data thus applied to the buses, which is to be applied to an arithmetic and logical unit is now transferred to registers. Then, the bit lengths to be processed, and the arithmetic operation unit in question as well, are directly designated by the OP field of a microinstruction and the result an operation is stored into lower eight-bit positions of the register B indirectly designated by the DR field of the inner instructions through a microprocessor.

Accordingly, different microprograms become necessary for each of the different data lengths to be processed even when an instruction is a user instruction for processing the same data operations. For instance, when a 32-bit microprocessor is used, each of microprograms is necessary in order to process data having 8-bit length, 16-bit length, and 32-bit length, respectively. As result, different microprograms must be prepared for processing data having different bit lengths. This, in turn, results in an increase of the memory capacity for storing different microprograms, thereby bringing about an increase in the access times of the microprograms as well as lowering the processing efficiencies of the microprocessor.

SUMMARY OF THE INVENTION

It is therefore an object of the present invention to provide a data processor in which the number of program steps for microprograms and access time can be reduced by making microprograms for processing data having different bit lengths into a common microprogram so as to increase the processing efficiency of the data processor.

It is another object of the present invention to provide a data processor in which information for designating bit lengths to be processed is contained in each of the inner instructions obtained by decoding each of the user instructions provided outside, and bit lengths are controlled by the information during data processing, thereby executing user instructions provided outside without designating the bit lengths by microprograms unlike the prior art data processor.

In order to achieve the above objects, the data processor according to the present invention comprises instruction decoding means including information for designating bit lengths of data by each of instructions provided outside of the data processing and for transforming each of the instructions into each of the inner instructions capable of being executed within the data processor, operational means for performing operations on data given in accordance with the bit lengths designated by the information in the inner instructions, and control means for controlling data to be operated on and the result of the operation by microprograms as well as instructing the contents of operation in the operational means.

One feature of the present invention resides in a data processor having an instruction decoder for decoding user instructions into inner instructions, an arithmetic operation unit, a microprogram storing section for storing microprograms, and a microinstruction decoder for decoding microinstructions of the microprograms read from the microprogram storing section wherein the data processor further comprises:

an inner instruction register having at least an operation field, a data length field for designating the bit lengths of data to be operated on in the arithmetic operation unit, source and destination register fields for designating a source register and a destination register among general purpose registers and their associated bit lengths respectively;

a microinstruction register having an operation field, first and second BUS fields, each having first and second information for designating the source register field or the destination register field of the inner instruction and for designating an ASL register or an ADL register, each provided between first and second buses and the arithmetic operation unit respectively, and a data expansion section provided between the general purpose registers and said first and second buses for expanding data specified bit lengths stored in the particular registers designated by the source and destination register fields in the inner instruction register, thereby making bit lengths of data to be processed common for a microprogram which operates on the same content of data processing but having different bit lengths.

These and other objects and features and advantages will be better understood from the following detailed description of the embodiment about of the invention with reference to the accompanying drawings.

BRIEF DESCRIPTION OF THE DRAWINGS

FIG. 4 is a block diagram of the contraction of an instruction execution section in the data processor according to the present invention shown in FIG. 1.

DETAILED DESCRIPTION OF THE PREFERRED EMBODIMENTS

Figure 1:
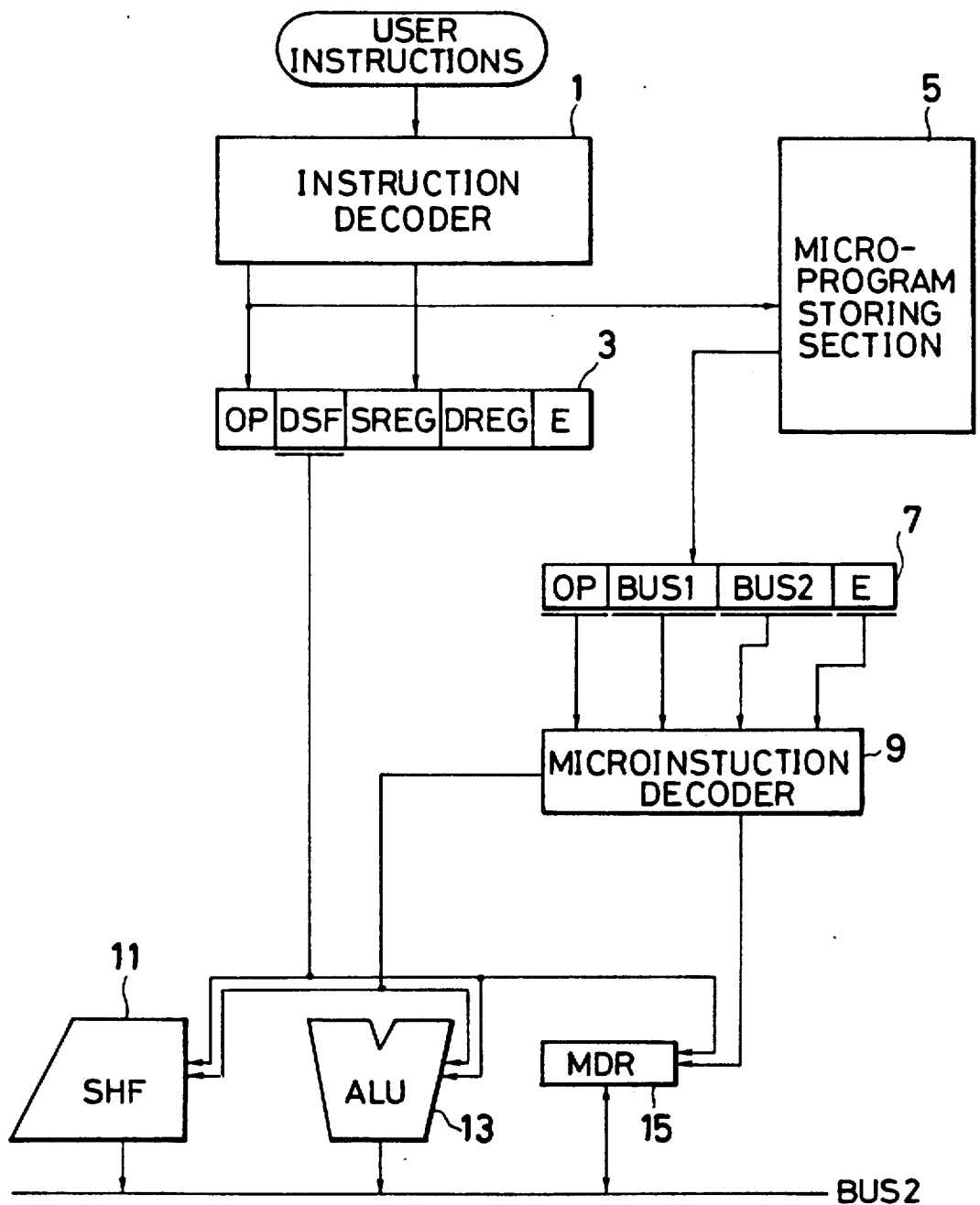
FIG. 1 is a block diagram of an overall construction of the data processor as one embodiment of the present invention.

FIG. 1 shows one embodiment of the data processor according to the present invention, in which an inner instruction which can be obtained by decoding each of the machine language instructions, i.e., user instructions, controls the bit lengths of data to be processed while executing the user instructions in accordance with the microprograms.

In FIG. 1, the data processor comprises an instruction decoding section 1, an inner instruction register 3, a microprogram storing section 5, and a microinstruction register 7.

The instruction decoding section 1 performs the function of decoding the machine language instructions or user instructions which are provided from outside of the data processor and for transforming the user instructions into the inner instructions in a form capable of being executed within the data processor.

Figure 2:
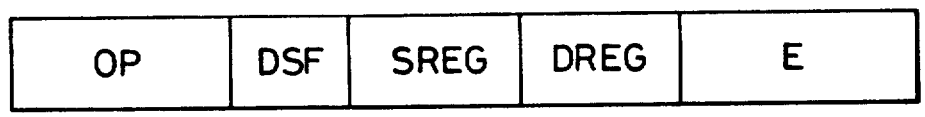
FIG. 2 shows one format of an inner instruction.

FIG. 2 shows a format of the inner instruction which consists of an operation (OP) field, a data size field (DSF), a source register (SREG) field, a destination register (DREG) field, and end (E) field. The operation field OP is the field in which the content of the user instruction to be processed and data for designating the bit lengths of data to be processed by an arithmetic unit ALU which will be referred to later during the operation, are stored.

The DSF field contains information for designating the bit lengths of data processed by an arithmetic operation unit (ALU).

The SREG field contains information for designating a register as a source register, and effective bit lengths of the data to be stored in the source register, and the information for designating an expansion mode for data.

The DREG field contains effective bit lengths of data to be stored in the destination register as well as information for designating a register as a destination register and the expansion mode data.

The end field is the one in which the end information is contained.

Returning to FIG. 1, each of the user instructions from outside is decoded by the instruction decoding section 1 and the instruction thus decoded is stored in the inner instruction register 3 as an inner instruction. The information contained in the OP field which constitutes an inner instruction is applied to the microprogram storing section 5, a microinstruction which corresponds the OP field is read from the microprogram storing section 5, and that microinstruction is stored in the microinstruction register 7.

The microprogram storing section 5 stores each microinstruction which corresponds each inner instruction.

On the other hand, microinstructions corresponding to the inner instructions are read from the microprogram storing section 5 by the content of the OP field of the inner instructions and are stored in the microinstruction register 7.

Figure 3:
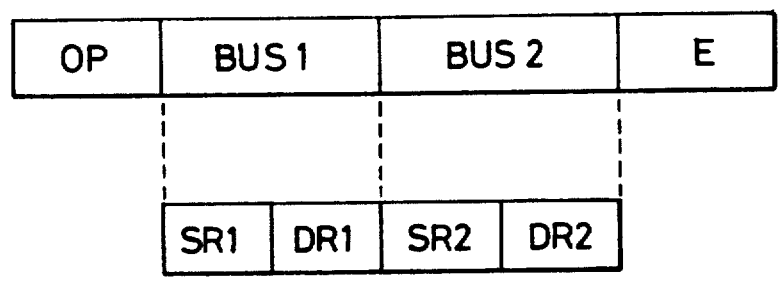
FIG. 3 shows one format of a microprogram.

FIG. 3 shows one format of a microinstruction to be stored in the microinstruction register 7. The microinstruction consists of an operation (OP) field, a bus-1 control (BUS 1) field, a bus-2 control (BUS 2) field and an end (E) field. The OP field is one in which the information for designating the category of the operations performed in the arithmetic unit ALU, is stored. The BUS 1 field is the one in which the information for designating registers when transferring data through the bus 1, is stored.

The BUS 1 field consists of a SR1 field and a DR 1 field in which information for designating a source register and a destination register during transferring of the data are stored respectively. The BUS 2 field is the one in which information for designating registers when transferring data through the bus 2 are stored. The BUS 2 field consists of two subfields, that is, a SR2 field and a DR 2 field in which information for designating a source register and a destination register during the transferring of data are stored respectively.

When a code (YS) for indirectly designating the source register is stored in the field, the SREG field of an inner instruction is designated and a source register is designated by the information stored in the SREG field. On the other hand, when a code (YD) is stored in the field for indirectly designating the destination register designated by the user instruction, the DREG field of the inner instruction is designated and a destination register is designated by the information stored in the DREG field.

The E field is the one in which information is located for controlling the end of microprograms corresponding to one user instruction. When "END" is designated by the E field, the next user instruction is read-out and is executed.

Returning now back to FIG. 1, the data processor according to the present invention further comprises a microinstruction decoder 9, a shift register 11, an arithmetic operation unit 13, and a memory data register 15.

The microinstruction decoder 9 is for decoding the microinstructions stored in the microinstruction register 7, which are read from the microprogram storing section 5. When the user instructions is decoded into each of a microinstruction, a control signal corresponding to each microinstruction is applied to the shift register 11, the arithmetic control unit 15, and memory data register 15 from the microinstruction decoder 9, each function of the shift register 11, the arithmetic control unit 13, and memory data register 15 is controlled by the control signal. The memory data register 15 here is for temporarily storing input and output data when data is transferred between the external memory and inner memory through the bus 2. The bit length of data to be output from this memory data register 15 is controlled by the information contained in the DSF field of the inner instruction.

FIG. 4 shows a block diagram of the construction of the execution section for executing different operations in the data processor shown in FIG. 1. The execution section comprises general purpose registers 17, a data expansion section 19, an ASL register 21, an ADL register 23, an arithmetic operation unit 13, and buses 1 and 2.

Among the general purpose registers 17 for storing various data to be operated on, the source register and the destination register are designated by the information containing in the SREG field and the DREG field of one inner instruction. The data stored in the registers thus designated is applied to the bus 1 or bus 2 through the data expansion section 19, and the data to be stored in the registers is supplied from the bus 2 through the data expansion section 19.

The data expansion section 19 functions to expand (e.g., zero expand, sign expand) the input and output data of a specific register designated among the general purpose registers in accordance with information for designating the expansion mode about the SREG field or the DREG field of one inner instruction.

The arithmetic operation unit 13 is for performing different arithmetic operations for both the data which is temporarily stored in the ASL register 21 from either bus 1 or the bus 2 and the data which is temporarily stored in the ADL register 23 from either bus 1 or bus 2. During the arithmetic operations described above, the bit length to be operated on is controlled by the information contained in the DSF field of the inner instruction and the result of the operation is applied to the bus 2.

Explanation will now be made about the data processor according to present invention, for executing one user instruction in which each of the lower eight-bit values of the 32-bit registers A and B among the general purpose registers 17 are added to each other and the result of the eight-bit operation is to be stored in the lower eight-bit positions of the register B.

In operation, the inner instruction decoded by the instruction decoder 1, which corresponds to one user instruction, are stored in the inner instruction register 3. The information for designating the eight-bit length to be operated on is contained in the DSF field of the inner instruction register 3. The SREG field contains the information for designating the general purpose register A as a source register having an effective eight-bit length, and the zero expansion information as well. The DREG field contains therein the information for designating the general purpose register B as a destination register having an effective eight-bit length and the zero expansion information in the expansion mode as well.

On the other hand, at the same time when the inner instruction is stored in the inner instruction register 3, the content of the OP field of the inner instruction is applied to the microprogram storing section 5 and is stored therein. Each microinstruction corresponding to the inner instruction, when read from the section 5, is stored in the microinstruction register 7. These microinstructions may be expressed by the following format in association with the format shown in FIG. 3;

—, YS, ASL, YD, ADL, —, —ADD,
—, —, ALU, YD, —, ENDA, where the mark (—) indicates no designation.

These microprograms are decoded by the microinstruction decoder 9. In the first step of a microinstruction, the SREG field of the inner instruction is designated by the designation of "YS" in the SR1 field. As a result, the general purpose register A is designated as a source register for data to be applied to the bus 1 and then the eight-bit data of the lower bit positions of the register A is applied to the bus 1 after being expanded into 32 bit data through the data expansion section 19. The data thus applied to the bus 1 is stored in the ASL register 21 by the designation of "ASL" in the DR1 field of the microinstructions.

Likewise, the DREG of the inner instruction field is designated by the designation of "YD" of the SR2 field of the microinstructions. As a result, the general purpose register B is designated as a source register for the data to be applied to the bus 2 and then the lower eight bit data of the register B is applied to the bus 2 after being expanded into 32-bit data through the data expansion section 19. The data thus applied to the bus 2 is stored in the ADL register 23 by the designation of the "ADL" in the DR 2 field.

In the second step of a microinstruction, the data in the ASL register 21 and the data in the ADL register 23 from the bus 1 and bus 2 are added through the arithmetic operation unit 13 in the eight-bit length by the designation of "ADD" in the OP field, in accordance with the DSF field of the inner instruction and the result of the calculation is applied to the bus 2 from the arithmetic operation unit 13, then, the DREG field of the inner instruction is referred to by the designation of "YD" of the DR 2 field and the result of the calculation, i.e., the lower eight bit values thus applied to the bus 2 is stored in the lower eight bit positions of the general purpose register B, thus terminating the execution of the user instruction.

In the manner described above, since the bit length to be operated on is controlled by the content in the DSF field of the inner instruction, although each of the user instructions is executed by the microprograms, it is not necessary to designate the bit length to be operated by the microinstructions.

Another user instruction such that each of the lower 16 bit data in the registers A and B should be added and the result of 16-bit addition should be stored in the lower 16 bit positions of the register B, can be likewise executed by the microprograms in the data processor according to the present invention.

In the prior art, on the other hand, when the eight bit length operation is desired, the operation field OP of the microinstruction has to be designated "ADD 8" in the second step thereof while when the 16 bit length operation is desired the OP field has to be designated "ADD 16". Namely, different microprograms are required for different bit length operations.

Whereas in the present invention, a common microprogram can be used for both the 8-bit operation and 16-bit operation in that data stored in the 32-bit general purpose registers A and B are added and the result of the operation is stored in the register B. In addition, when 16-bit operation is desired for 32-bit data which is applied to the memory data register 15 from an external memory, the bit length to be operated on is designated by the DSF field of the inner instruction while designating "MDR" by the SR1 or SR2 field of the microinstruction. As a result, the lower 16-bit data of the memory data register 15 is expanded into 32-bit data and it is applied to the bus 1 or the bus 2, thereby realizing a common microprogram for data stored not only in registers but also in a memory, regardless of different bit lengths, according to the present invention.

In a foregoing embodiment, the description has been provided concerning the adding operation of data having either an 8-bit length or a 16-bit length. It is however, apparent that the operation is not limited to the above bit length operations. The microprograms for performing with more than 16-bit data can be made in common in accordance with memory capacity and the capacity of registers.

As described in the foregoing embodiment, since the bit length of data to be processed can be designated by an inner instruction, a microinstruction for performing the operation of for data having the same content but having different bit lengths can be made common, thereby reducing the number in steps of the microprograms. As a result, the memory zones for the microprograms can be reduced as well as increasing the operation efficiency by the reduction of the access time of the microprograms.

While the invention has been described in its preferred embodiment, it is to be understood that the words which have been used are words of description rather than limitation and that various changes and modifications may be made within the pure view of the appended claims without departing from the true scope and sprit of the invention in its broader aspects.

What is claimed is:

1. A data processor comprising:
   an instruction decoder for receiving and decoding a user instruction and outputting a corresponding inner instruction, said inner instruction including an opcode field, a source register field, a destination register field and a bit length information field indicating bit length information for data of different bit lengths to be manipulated during execution of said inner instructions;
   an inner instruction register coupled to said decoder for receiving and storing said inner instruction;
   a microprogram storing section coupled to said decoder for receiving an opcode contained in said opcode field of said inner instruction, said opcode designating a starting address in said microprogram storing section, and for successively outputting microinstructions starting from said starting address;
   a microinstruction decoder coupled to said microprogram storing section for receiving and decoding said microinstructions and outputting corresponding decoded microinstructions;
   means coupled to said inner instruction register for receiving said bit length information of said inner instruction and coupled to said microinstruction decoder for receiving said decoded microinstructions and for executing said decoded microinstructions by carrying out operations with said data of different bit lengths in accordance with a particular bit length denoted by said bit length information, said means for executing including a data register for storing said data;
   a microinstruction register for holding said microinstructions outputted from said microprogram storing section and for supplying said microinstructions to said an operation field and first and second BUS fields, each of said BUS fields containing first and second information designating a source register field and a designation register field of said inner instruction; and
   said means for executing including an arithmetic operation unit;
   first and second buses;
   wherein said means for executing further includes an ASL register and an ADL register coupled between said first and second buses and said arithmetic operation unit; and
   wherein said first and second information further designates said ASL register or said ADL register;
   a plurality of general purpose registers; and
   a data expansion section coupled between said general purpose registers and said first and second buses for expanding, by specified bit lengths, data stored in particular ones of said general purpose registers designated by said source and destination fields in said inner instruction, for making bit lengths of data to be processed common for a microprogram which operates for data having the same content but having different bit lengths.

2. The data processor as claimed in claim 1 wherein said first and second information for designating said source register field and said destination register field of said inner instruction are YS and YD.

3. The data processor as claimed in claim 1 wherein the bit lengths of data to be processed are 8-bit, 16-bit or 32-bit, respectively.

* * * * *